(12) United States Patent
Schaider et al.

(10) Patent No.: US 10,843,431 B2
(45) Date of Patent: Nov. 24, 2020

(54) DEVICE FOR PRODUCING PELLETS

(71) Applicant: JOSEF SCHAIDER PRIVATSTIFTUNG, Tulln-Staasdorf (AT)

(72) Inventors: Ludwig Schaider, Staasdorf (AT); Josef Schaider, Staasdorf (AT)

(73) Assignee: JOSEF SCHAIDER PRIVATSTIFTUNG, Tulln-Staasdorf (AT)

( * ) Notice: Subject to any disclaimer, the term of this patent is extended or adjusted under 35 U.S.C. 154(b) by 0 days.

(21) Appl. No.: 16/468,214

(22) PCT Filed: Dec. 7, 2017

(86) PCT No.: PCT/EP2017/081837
§ 371 (c)(1),
(2) Date: Jun. 10, 2019

(87) PCT Pub. No.: WO2018/104457
PCT Pub. Date: Jun. 14, 2018

(65) Prior Publication Data
US 2019/0389166 A1    Dec. 26, 2019

(30) Foreign Application Priority Data
Dec. 9, 2016 (AT) .................................. 51120/2016

(51) Int. Cl.
*B30B 11/20* (2006.01)
*B30B 11/22* (2006.01)
*B29B 9/10* (2006.01)

(52) U.S. Cl.
CPC .......... *B30B 11/202* (2013.01); *B30B 11/208* (2013.01); *B30B 11/228* (2013.01); *B29B 9/10* (2013.01)

(58) Field of Classification Search
CPC .. B29B 9/06; B29B 9/10; B30B 11/20; B30B 11/208; B01J 2/20
(Continued)

(56) References Cited

U.S. PATENT DOCUMENTS 2,241,546 A    5/1941    Evenstad et al.
2,848,738 A    8/1958    Bonnafoux
(Continued)

FOREIGN PATENT DOCUMENTS

AT           122169 B      4/1931
AT           346705 B     11/1978
(Continued)

OTHER PUBLICATIONS

International Search Report, dated Apr. 18, 2018, from corresponding PCT application No. PCT/EP2017/081837.

*Primary Examiner* — James P Mackey
(74) *Attorney, Agent, or Firm* — Nixon & Vanderhye

(57) ABSTRACT

A device for producing pellets has a machine frame, a hollow outer cylinder mounted therein with a first axis of rotation and an inner cylinder, arranged in the outer cylinder, with a second axis of rotation, wherein a wedge-shaped gap is formed between an inner surface of the outer cylinder and an outer surface of the inner cylinder, the outer cylinder and/or the inner cylinder has radial holes for pressing through material, and a pivot arm is arranged on each of the two sides next to the inner cylinder, on which pivot arms the inner cylinder is rotatably mounted. Each pivot arm is moveably mounted on the machine frame in the region of both ends of the pivot arm.

20 Claims, 3 Drawing Sheets

(58) Field of Classification Search
USPC .......................................................... 425/331
See application file for complete search history.

(56) References Cited

U.S. PATENT DOCUMENTS

| | | | | |
|---|---|---|---|---|
| 5,248,469 | A * | 9/1993 | Wilhelm | ................... B29B 9/06 264/118 |
| 8,974,710 | B2 * | 3/2015 | Blok | ..................... B30B 11/208 264/118 |
| 9,682,524 | B2 * | 6/2017 | Paeper | ...................... B29B 9/06 |
| 10,368,493 | B2 * | 8/2019 | Schaider | ................ A01D 69/00 |

FOREIGN PATENT DOCUMENTS

| | | | |
|---|---|---|---|
| CN | 204170700 | U | 2/2015 |
| SU | 763154 | A1 | 9/1980 |
| SU | 958134 | A1 | 9/1982 |
| SU | 1006276 | * | 3/1983 |
| SU | 1076067 | A1 | 2/1984 |

\* cited by examiner

DEVICE FOR PRODUCING PELLETS

BACKGROUND OF THE INVENTION

Field of the Invention

The invention relates to a device for producing pellets, with a machine frame, a hollow outer cylinder mounted therein with a first axis of rotation, and an inner cylinder arranged in the outer cylinder with a second axis of rotation, whereby a wedge-shaped gap is formed between an inner surface of the outer cylinder and an outer surface of the inner cylinder, whereby the outer cylinder and/or the inner cylinder has/have essentially radially-oriented holes for pressing through material, and whereby in each case a pivot arm, on which the inner cylinder is mounted to rotate, is arranged on either side next to the inner cylinder.

Description of the Related Art

The pressing of crushed material into the form of pellets, which is also referred to as pelleting, offers numerous advantages, such as, for example, an increased bulk density, a standardized material size, and an avoidance of separating various starting materials. In the preparation of fuel, fodder, or litter, pellets that consist of crushed biomass, e.g., wood pellets, straw pellets, or residual pellets, have gained importance in recent decades and now occupy an important place.

A device for forming strands from an incinerator charge mixture is known from AT 122 169 B. In the device described therein, the incinerator charge mixture is introduced into a wedge-shaped gap between a rotating, hollow outer cylinder and a rotating inner cylinder that is arranged therein. The outer cylinder is put into rotation via a shaft, and the inner cylinder, which is mounted to rotate between two arms and which hangs downward on the two arms that are mounted to rotate on the shaft, presses the incinerator charge mixture through radial holes of the outer cylinder in the form of strands.

In addition, a device for producing pressed items from bulk material is described in AT 346 705 B. In the case of this device, a wedge-shaped gap, into which the bulk material is introduced, is formed between a press ring and a hollow press roller that is arranged therein. The press roller is put into rotation, causing the bulk material to be pressed through radial holes of the press ring and the press roller to form pressed items.

Since the material to be pressed, in particular crushed biomass, can have a very different composition, in particular which relates to material properties and sizes of the crushed material, it is disadvantageous when the device for pressing pellets cannot be matched to various properties.

SUMMARY OF THE INVENTION

The object of the invention is therefore to make available a device of the above-mentioned type, which can be used more flexibly than the devices known from the state of the art.

This object is achieved according to the invention with a device that has the features disclosed.

Preferred and advantageous embodiments are also disclosed.

According to the invention, it is provided that each pivot arm is mounted to move on the machine frame in the area of its two ends. As a result, the position of the axes of rotation of the outer and inner cylinders relative to one another and thus also the size of the wedge-shaped gap between the outer and inner cylinders can be changed, and the device can be adapted simply and effectively to differently-composed crushed materials, in particular biomass.

In the case of the invention, it is especially preferred when a connecting element, which is swivel-connected to the first end of the pivot arm via a first bearing and to the machine frame via a second bearing, is arranged between the first end of each pivot arm and the machine frame.

In a preferred further development of this embodiment, the distance between the two bearings can be adjusted manually or automatically, for example by having the connecting element have a threaded rod. The distance between the axes of rotation of the outer and inner cylinders and thus the gap width can consequently be scaled up or down.

As an alternative or in addition to this adjustment possibility, an embodiment within the scope of the invention is especially preferred in which each pivot arm on the second end is mounted on the machine frame by means of an eccentric shaft. Also, the distance between the axes of rotation of the outer and inner cylinders and thus the gap width can consequently be scaled up or down.

In a preferred further development of this embodiment, the eccentric shaft has at least one first section with a first axis of rotation and at least two additional sections with a second axis of rotation. The second axis of rotation is parallel to the first axis of rotation, i.e., it is at a distance to the latter, causing the additional sections to be eccentric to the first section. The eccentric shaft is mounted to rotate with the first section in the machine frame and with the additional sections in respectively a second end of each pivot arm. By rotation of the eccentric shaft, the gap width can thus be adjusted.

In the case of this embodiment, it can furthermore be provided that the eccentric shaft can be rotated via a drive. In this case, an electric motor, in particular a three-phase a.c. motor, is preferably used, whereby a gear is preferably arranged between the motor and the eccentric shaft. Within the scope of the invention, however, the drive can also be provided manually via a lever or a crank.

The wedge-shaped gap between the outer and inner cylinders has a gap width that can be changed, in particular scaled up or down, by changing the distance between the bearings of the connecting element and/or by rotating the eccentric shaft. Means, in particular sensors, can be arranged on the connecting element and/or on the eccentric shaft in order to be able to detect and display the distance between the bearings and/or the twist angle of the eccentric shaft.

In an especially advantageous embodiment, it is provided that both the outer and inner cylinders are made hollow and have essentially radially-aligned holes. Preferably, the inner cylinder is driven via a gear by a drive, and the material, in particular the crushed biomass, is introduced into the gap that tapers into a wedge shape and is pressed through the holes into an inner space of the inner cylinder and out from the outer cylinder. The material is thus compressed and brought into the form of pellets.

BRIEF DESCRIPTION OF THE DRAWINGS

Additional details, features, and advantages of the invention follow from the description below with reference to the attached drawings, in which an embodiment that is preferred and not limited to the scope of protection is depicted. Here.

DESCRIPTION OF THE PREFERRED EMBODIMENTS

Figure 1:
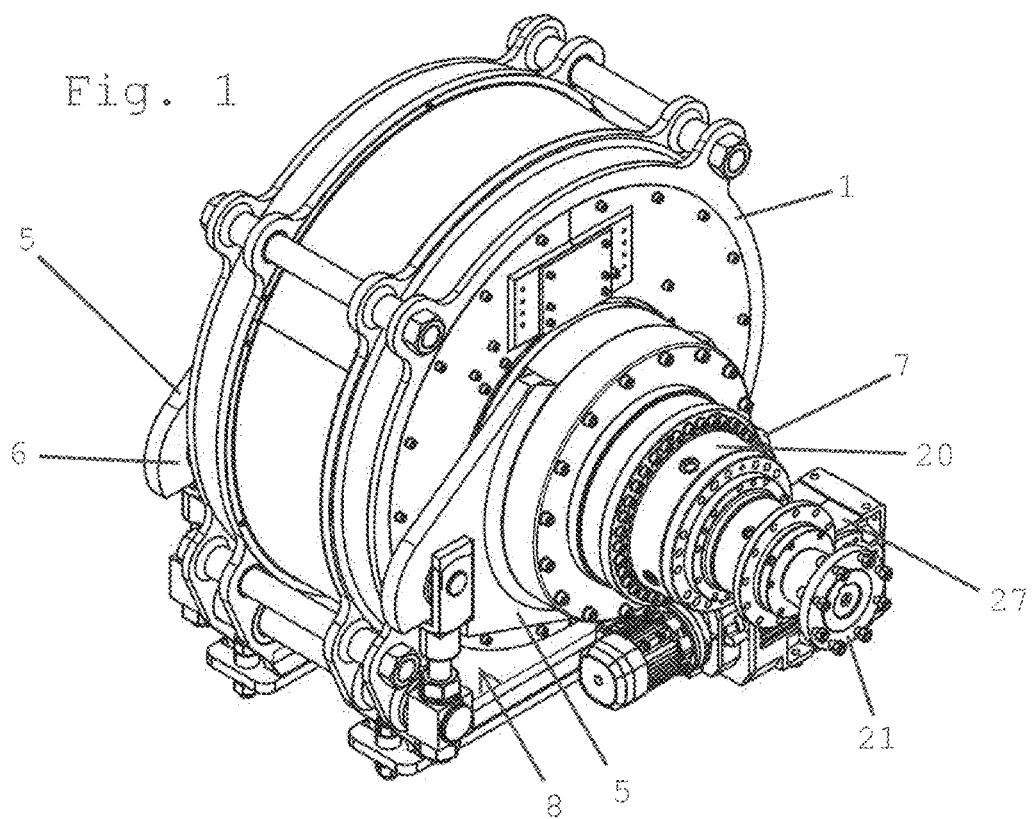
FIG. 1 shows an isometric view of a device according to the invention.
Figure 2:
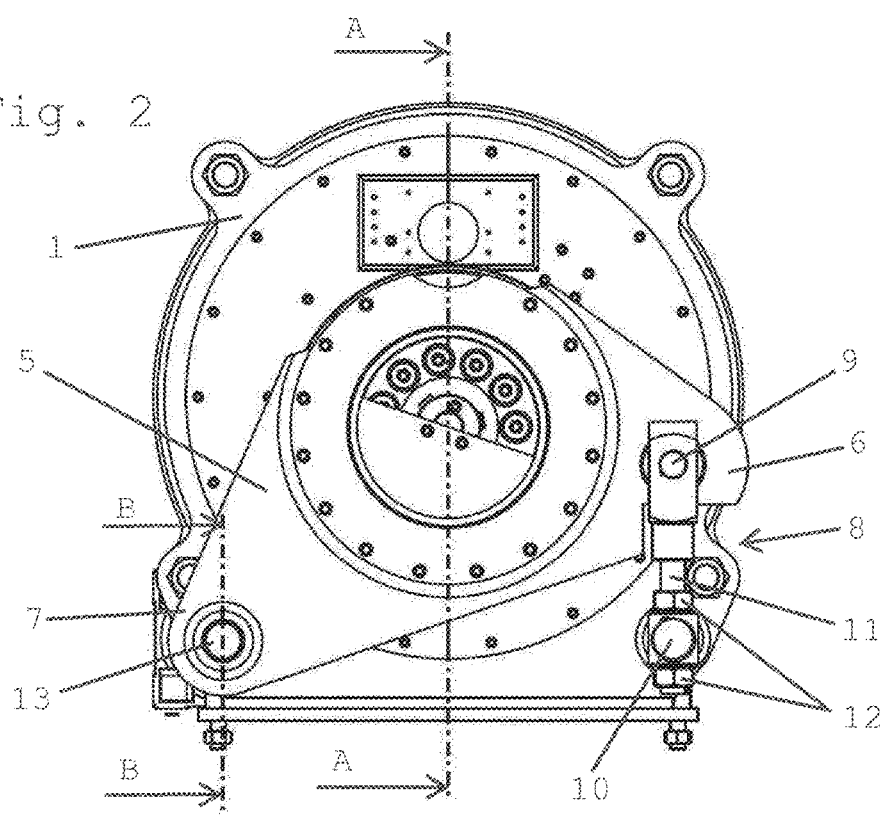
FIG. 2 shows a front view of a device according to the invention.

FIG. 1 shows a device according to the invention for producing pellets, in particular that consist of crushed biomass, in an isometric view.

Figure 5:
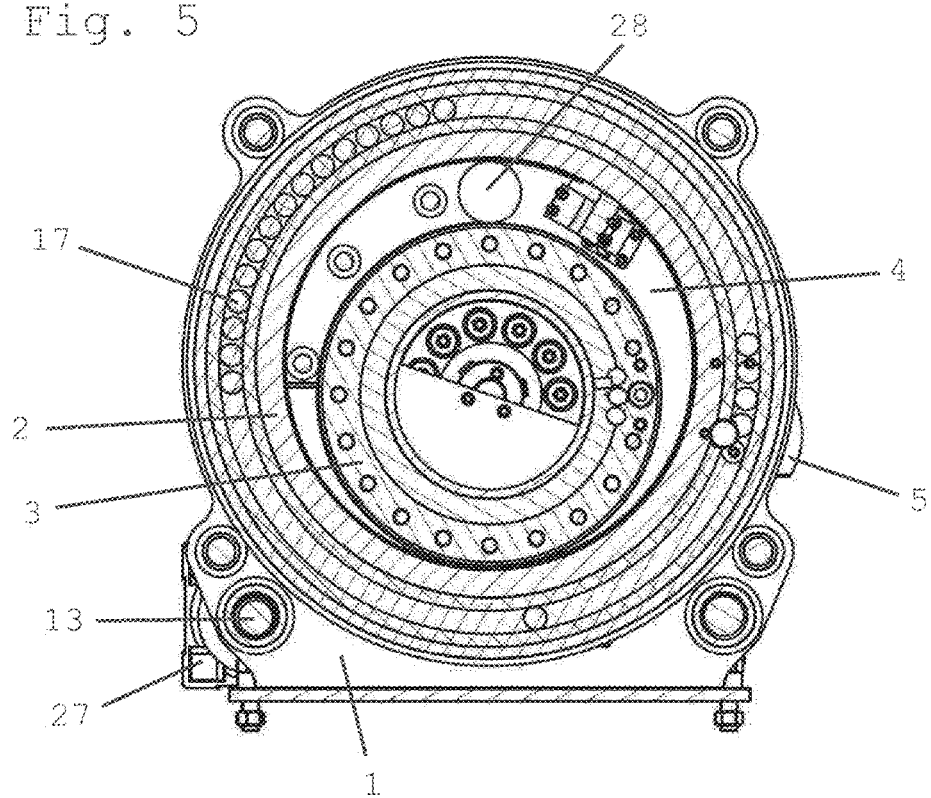
FIG. 5 shows a section through the device that is normal to the sectional plane of FIG. 3.

A hollow outer cylinder 2 is mounted to rotate in a machine frame 1, and a hollow inner cylinder 3 is arranged in the hollow outer cylinder 2. A wedge-shaped gap 4 is formed between an inner surface of the outer cylinder 2 and an outer surface of the inner cylinder 3 (FIG. 5).

Pivot arms 5 are mounted to move on the machine frame 1 on either side of the inner cylinder 3. The inner cylinder 3 is mounted to rotate approximately in the central area of the pivot arms 5.

Each pivot arm 5 has two ends 6, 7. The first end 6 of the pivot arm 5 is connected movably to the machine frame 1 via a connecting element 8. The connecting element 8 is swivel-connected to the first end 6 of the pivot arm 5 via a bearing 9 and to the machine frame 1 via another bearing 10.

The second end 7 of the pivot arm 5 is mounted to rotate on the machine frame 1 via an eccentric shaft 13.

In the depicted embodiment, the connecting element 8 has a threaded rod 11 with two screw nuts, between which a bearing bolt of the other bearing 10 is attached. By adjusting the screw nuts 12, the distance between the two bearings 9, 10 and thus the size of the gap 4 can be scaled up or down.

Figure 4:
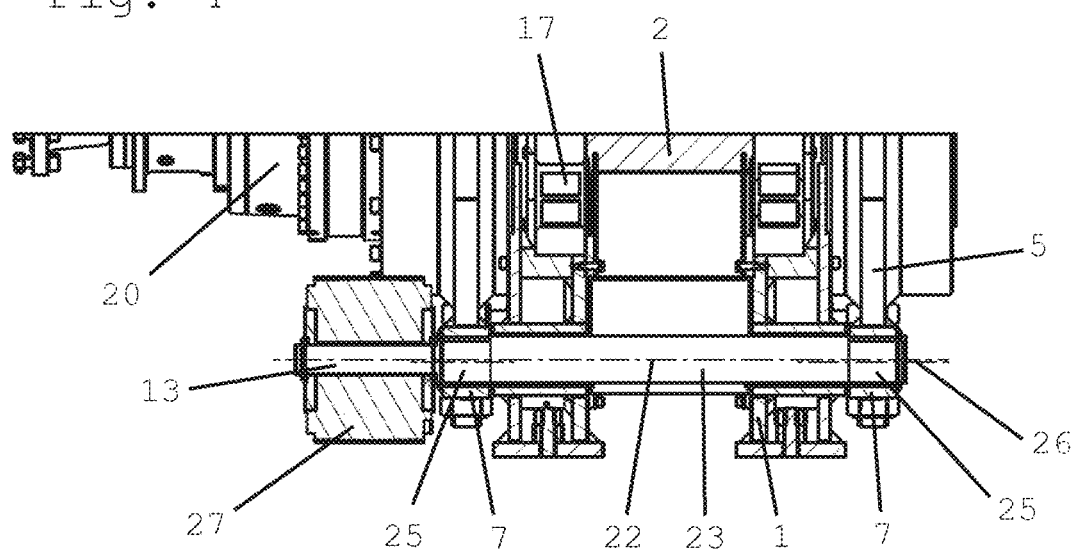
FIG. 4 shows a section along the line B-B in FIG. 2.

As depicted in FIG. 4, the eccentric shaft 13 has a first section 23 with a first axis of rotation 22, which is mounted to rotate at two points 24 in the machine frame 1, for example in sliding bearing bushes. Two additional sections 25 with a common second axis of rotation 26 are mounted to rotate in the second ends 7 of the pivot arms 5, for example also in sliding bearing bushes.

The second axis of rotation 26 is parallel to the first axis of rotation 22, causing the additional sections 25 to be eccentric relative to the first section 23.

The second ends 7 of the pivot arms 5 are raised or lowered and simultaneously moved sideways by a rotation of the eccentric shaft 13 using a drive 27, for example a three-phase a.c. motor. The pivot arms 5 are able to execute the lateral movements accompanying the rotation of the eccentric shaft 13 by the connecting elements 8 and the thus formed connections between the pivot arms 5 and the machine frame 1 that in each case have two degrees of freedom.

For example, a preliminary adjustment or a rough adjustment of the gap width can be performed by the connecting elements 8, and an ongoing matching or a fine adjustment of the gap width can be performed by the eccentric shaft 13.

The drive 27 is connected via a transmission gearing, for example a planetary gear, not depicted in detail, to the eccentric shaft 13, and a sensor, in particular a rotary transducer, is arranged on the eccentric shaft 13 or in the drive 27, which sensor measures the rotation of the eccentric shaft 13, by which the width of the gap 4 can be determined.

The outer cylinder has a first axis of rotation 14 and is mounted on either side in the machine frame 1 via two cylindrical roller bearings 17.

The inner cylinder 3 has a second axis of rotation 15 that is parallel to the first axis of rotation 14 and is in each case mounted to rotate via a spherical roller bearing 18 in the pivot arms 5.

In the depiction in FIG. 5, the wedge-shaped gap 4 that can be adjusted as described above has a maximum width above and a minimum width below.

Figure 3:
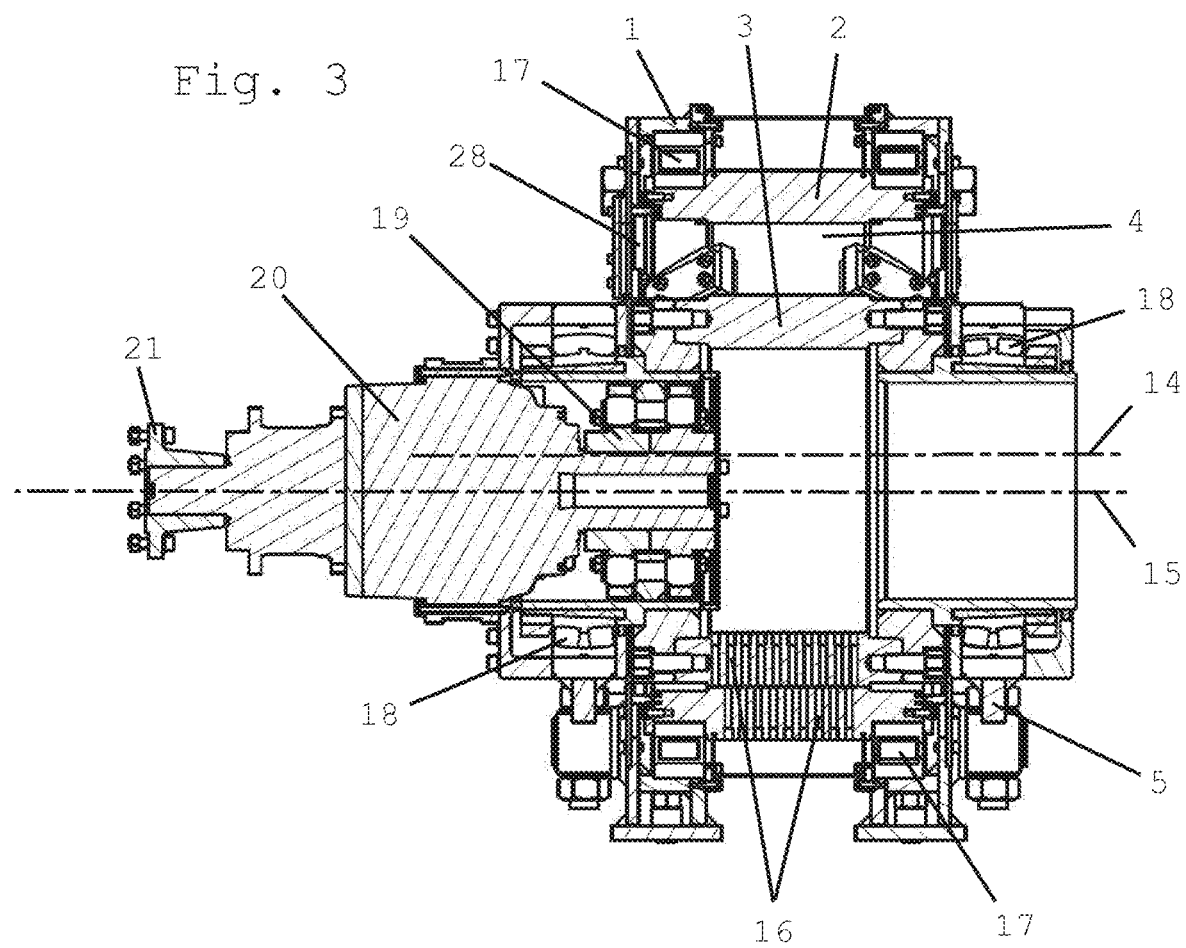
FIG. 3 shows a section along the line A-A in FIG. 2.

A coupling 19 connects the inner cylinder 3 to a gear 20, which is not depicted in detail in FIG. 3 and can be, for example, a planetary gear. The gear 20 is connected via another coupling 21 to a drive shaft, e.g., a power train, which is not depicted and which is driven by a main drive, also not depicted, causing the inner cylinder 3 to be put into rotation. The outer cylinder 2 rotates because of frictional forces, which develop between the cylinders 2, 3 and the material that is pressed together between them, in the same direction as the inner cylinder.

In an alternative embodiment, not depicted, the outer cylinder 2 is driven and put into rotation with a main drive, whereby the rotation of the inner cylinder 3 is produced because of the frictional forces between the cylinders 2, 3 and the material. Another alternative embodiment provides that both the inner cylinder 3 and the outer cylinder 2 are driven.

The material is introduced in the upper area of the wedge-shaped gap 4 through a fill opening 28 between the cylinders 2, 3 and is moved by the rotation of the same to the lower area of the gap 4 in the area of minimum width.

Both the outer cylinder 2 and the inner cylinder 3 have essentially radially-oriented holes 16, through which the material, in particular crushed biomass, is pressed with the inner cylinder 3 and the outer cylinder 2 rotating in the area of minimum width of the gap 4 and is formed into pellets.

The pellets that are formed from the outer cylinder 2 fall down from the device, for example directly into a collecting tank or onto a conveying system. The pellets formed from the inner cylinder 2 collect in the interior of the inner cylinder 2 and can, since the device and the inner cylinder 2 are open to one side, fall out or be removed laterally from the device.

The invention claimed is:

1. A device for producing pellets, comprising:
   a machine frame;
   a hollow outer cylinder mounted in the machine frame with a first axis of rotation;
   an inner cylinder disposed in the outer cylinder with a second axis of rotation, a wedge-shaped gap being defined between an inner surface of the outer cylinder and an outer surface of the inner cylinder, one or more of the outer cylinder and the inner cylinder including radial holes configured to press through material;
   two pivot arms, on which the inner cylinder is mounted to rotate, being respectively disposed next to the inner cylinder on a respective side of the inner cylinder, each pivot arm having a first end and a second end, each pivot arm being mounted to move on the machine frame at the first end and the second end of the respective pivot arm.

2. The device according to claim 1, further comprising two connecting elements, each of the connecting elements being swivel-connected to the first end of the respective pivot arm via a first bearing and to the machine frame via a second bearing.

3. The device according to claim 2, wherein a distance between the first bearing and the second bearing of the respective connecting element is adjustable.

4. The device according to claim 1, wherein the respective second end of each pivot arm is mounted on the machine frame by an eccentric shaft.

5. The device according to claim 4, wherein the eccentric shaft has at least one first section with a third axis of rotation and at least two additional sections with a fourth axis of rotation, the fourth axis of rotation being parallel to the third axis of rotation, and
wherein the eccentric shaft is mounted to rotate with the at least one first section in the machine frame and with the at least two additional sections in, respectively, the second end of each of the pivot arms.

6. The device according to claim 4, wherein the eccentric shaft is configured to be rotated via a drive.

7. The device according to claim 4, wherein a measurement device configured to measure rotation of the eccentric shaft is disposed in a vicinity of the eccentric shaft.

8. The device according to claim 1, wherein the inner cylinder is mounted on the two pivot arms via inner cylinder bearings, and/or
wherein the outer cylinder is mounted on the machine frame on two sides of the machine frame via outer cylinder bearings.

9. The device according to claim 1, wherein the inner cylinder is hollow.

10. The device according to claim 1, wherein the inner cylinder is connected to a main drive on at least one side via a gear.

11. The device according to claim 1, wherein each of the pivot arms on the second end thereof is mounted the eccentric shaft on the machine frame.

12. The device according to claim 3, wherein the respective second end of each pivot arm is mounted on the machine frame by an eccentric shaft.

13. The device according to claim 5, wherein the eccentric shaft is configured to be rotated via a drive.

14. The device according to claim 7, wherein the measurement device is a sensor.

15. The device according to claim 14, wherein the sensor is a rotary transducer.

16. The device of claim 8, wherein the bearings are roller bearings.

17. The device of claim 16, wherein the roller bearings are spherical roller bearings.

18. The device according to claim 5, wherein a measurement device configured to measure rotation of the eccentric shaft is disposed in a vicinity of the eccentric shaft.

19. The device according to claim 6, wherein a measurement device configured to measure rotation of the common eccentric shaft is disposed in a vicinity of the common eccentric shaft.

20. The device according to claim 2, wherein the inner cylinder is mounted on the two pivot arms via inner cylinder bearings, and/or
wherein the outer cylinder is mounted on the machine frame on two sides of the machine frame via outer cylinder bearings.

* * * * *